(12) United States Patent
Lin

(10) Patent No.: US 10,627,599 B2
(45) Date of Patent: Apr. 21, 2020

(54) OPTICAL LENS SYSTEM

(71) Applicant: HON HAI PRECISION INDUSTRY CO., LTD., New Taipei (TW)

(72) Inventor: Chia-Wen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 28 days.

(21) Appl. No.: 15/817,291

(22) Filed: Nov. 20, 2017

(65) Prior Publication Data

US 2019/0094493 A1 Mar. 28, 2019

Related U.S. Application Data

(60) Provisional application No. 62/563,637, filed on Sep. 26, 2017.

(51) Int. Cl.
*G02B 9/62* (2006.01)
*G02B 13/04* (2006.01)

(52) U.S. Cl.
CPC .............. *G02B 9/62* (2013.01); *G02B 13/04* (2013.01)

(58) Field of Classification Search
CPC ........ G02B 9/62; G02B 9/64; G02B 13/0045; G02B 13/18; G02B 3/04; G02B 13/001; G02B 23/243

USPC .................................. 359/755, 756, 761, 713
See application file for complete search history.

(56) References Cited

U.S. PATENT DOCUMENTS

| 9,715,088 B1 * | 7/2017 | Yang ................... G02B 13/0045 |
| 2012/0170142 A1 * | 7/2012 | Hsieh ....................... G02B 9/62 |
| | | 359/762 |
| 2017/0307852 A1 * | 10/2017 | Chen ...................... G02B 13/06 |

FOREIGN PATENT DOCUMENTS

TW I582458 B 5/2017

* cited by examiner

*Primary Examiner* — William R Alexander
*Assistant Examiner* — Alberto J Betancourt
(74) *Attorney, Agent, or Firm* — ScienBiziP, P.C.

(57) ABSTRACT

An optical lens of the present disclosure assembly includes, in order from an object side to an image side, a first lens element, a second lens element, a third lens element, a fourth lens element, a fifth lens element, a sixth lens element, an optical filter and a sensor. The optical lens also has an axis. The first lens element and the fifth lens element have negative power, the second lens element, the third lens element, the fourth lens element and the sixth lens element have positive power.

10 Claims, 7 Drawing Sheets

OPTICAL LENS SYSTEM

FIELD

The subject matter herein generally relates to a lens, especially, relates to an optical lens system.

BACKGROUND

In a field of photography, an optical lens system is used to acquire visible light to capture the images. Moreover, the optical lens system having a wide angle can acquire more visible light and is more widely used.

Generally, the optical lens system having a wide angle includes many projecting method. For example, Stereographic: y=2F*tan(θ/2), Equidistant: y=F*θ, Equisolid angle: y=2F*sin(θ/2), and Orthographic: y=F*sin θ, wherein F is a focal length of the optical lens, θ is a half view angle, y is a height corresponding to the θ. However, a quality of imaging of the optical lens system having a wide angle usually is not good.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
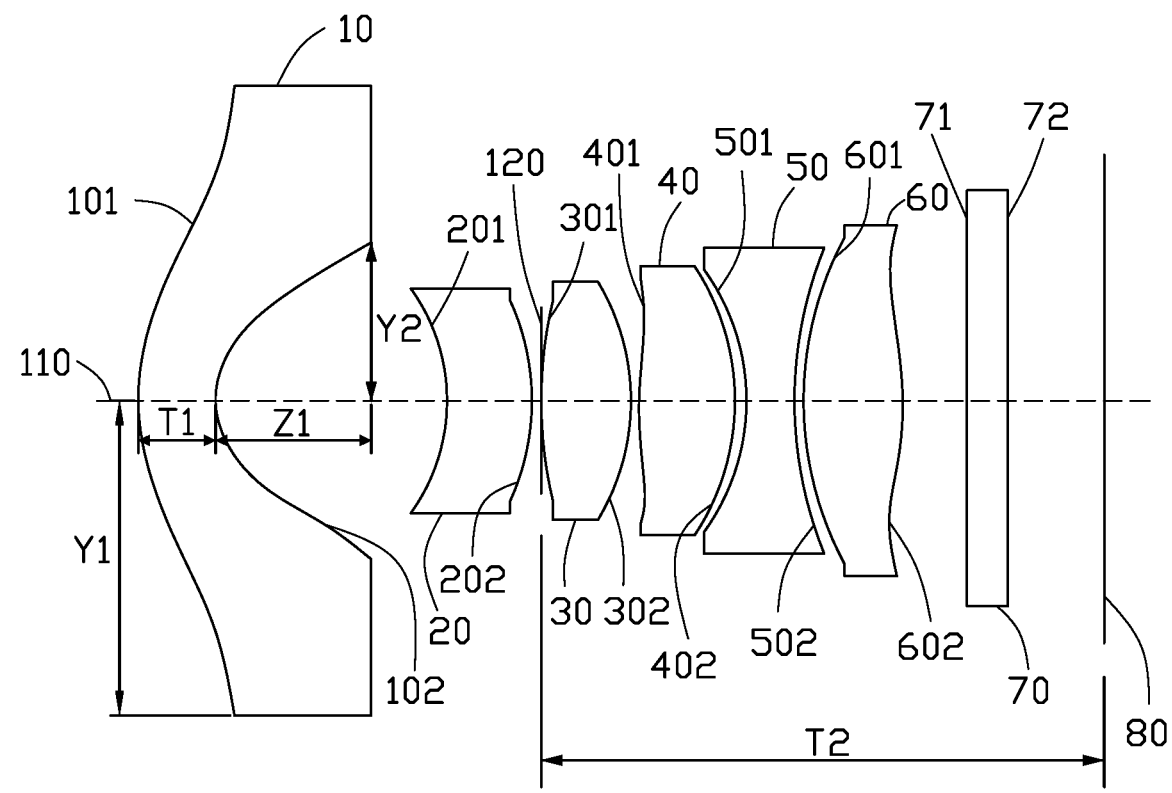
FIG. 1 is a diagrammatic, cross sectional view of an optical lens system of the present

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

An optical lens system of the present disclosure assembly in order from an object side to an image side includes a first lens element 10, a second lens element 20, a third lens element 30, a fourth lens element 40, a fifth lens element 50, a sixth lens element 60, an optical filter 70 and a sensor 80.

The optical lens system also has an axis 110. The first lens element 10, a second lens element 20, a third lens element 30, a fourth lens element 40, a fifth lens element 50 and a sixth lens element 60 are symmetrical about the axis 110.

The first lens element 10 has negative power and has a first surface 101 and a second surface 102 opposite to the first surface 101. The first surface 101 is aspheric and convex toward the object side. The second surface 102 is aspheric. A center of the second surface 102 is concave toward the image side. A periphery of the second surface 102 is a flat surface.

The second lens element 20 has positive power. The second lens element 20 has a third surface 201 and a fourth surface 202. The third surface 201 is aspheric and is concave toward the object side. The fourth surface 202 is aspheric and is convex toward the image side.

The third lens element 30 has positive power. The third lens element 30 has a fifth surface 301 and a sixth surface 302. The fifth surface 301 is aspheric and is convex toward the object side. The sixth surface 302 is aspheric and is convex toward the image side.

An aperture 120 is mounted between the second lens element 20 and the third lens element 30. The aperture 120 is located on the optical axis 110. A distance between the aperture 120 and the fifth surface 301 is smaller than a distance between the fourth surface 202 and the aperture 120.

The fourth lens element 40 has positive power. The fourth lens element 40 has a seventh surface 401 and a eighth surface 402. The seventh surface 401 is convex toward the object side. The eighth surface 402 is convex toward the image side.

The fifth lens element 50 has negative power. The fifth lens element 50 has a ninth surface 501 and a tenth surface 502. Both the ninth surface 501 and the tenth surface 502 are aspheric. A center of the ninth surface 501 is concave toward the object side. The tenth surface 502 is concave toward the image side.

The sixth lens element 60 has positive power. The sixth lens element 60 has an eleventh surface 601 and a twelfth surface 602. The eleventh surface 601 is aspheric and is convex toward the object side. The twelfth surface 602 is convex toward the image side.

The optical filter 70 has a front surface 71 and a rear surface 72. The front surface 71 and the rear surface are flat plane. The optical filter 70 is used to filter infrared light throughout the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 are aspherical surfaces. The even aspherical surface are shaped according to the formula:

$$Z = \frac{ch^2}{1 + \sqrt{1-(k+1)c^2h^2}} + \Sigma A_i h^i \tag{a}$$

Wherein Z is aspherical surface sag of surface, h is a surface height from the optical axis 110, c is a curvature, k is a conic constant, and Ai are i-th order aspheric coefficients of surface.

The optical lens system satisfies the formulas:

$$0.05 < (D/TTL) < 0.15 \quad (1)$$

$$2\omega > 150 \quad (2)$$

$$1.8 < |f3/F| < 2.1 \quad (3)$$

$$2.3 < |f4/F| < 2.7 \quad (4)$$

$$1.3 < |f5/F| < 1.5 \quad (5)$$

$$1.8 < |f6/F| < 2.1 \quad (6)$$

$$-3 < SF1 < -1 \quad (7)$$

$$15 < SF2 < 17 \quad (8)$$

$$Y1/T1 < 4 \quad (9)$$

$$Y2/Z1 > 1 \quad (10)$$

$$T2/MIC > 1 \quad (11)$$

Wherein, D is a diameter of the aperture 120. TTL is a length along the optical axis 110 defined between the first surface 101 of the first lens element 10 and the sensor 80. ω is a half field view angle of the optical lens. F is the focal length of the optical lens. f3 is the focal length of the third lens element 30. f4 is the focal length of the fourth lens element 40. f5 is the focal length of the fifth lens element 50. f6 is the focal length of the sixth lens element 60. Y1 is effective semi-diameter of the first surface 101 of the first lens element 10 to the optical axis 110. T1 is a length along the optical axis 110 defined between the first surface 101 and the second surface 102 of the first lens element 10. Y2 is maximum effective semi-diameter of the second surface of the first lens element 10 to the optical axis 110. Z1 is a sag value of maximum effective aperture of second surface 102 of the first lens element 10. T2 is a length along the optical axis 110 defined between the aperture 102 and the sensor 80. MIC is the maximum imaging circle.

The formulas (1)-(2) are used to limit a size of the aperture 120 and total length of the whole optical system. It makes sure the optical system length as short as possible for large field of view and size of aperture stop. The formulas (3)-(6) ensure a diopter of the third lens element 30, a diopter of the fourth lens element 40, a diopter of the fifth lens element 50 and a diopter of the sixth lens element 60 are similar. It can distribute power evenly, and not excessively concentrate sensitivity. The formulas (9)-(10) limit a size, thickness and surface angle of the first lens element 10. The formulas (11) further limits the length between the aperture 120 and the image 80 to make the optical lens system assembling easily. Thus, the formulas (1)-(11) together ensure that the optical lens system having a large viewing angle and good imaging quality.

The following embodiment specifically illustrated the optical lens system by different parameter.

Referring to tables 1-5 illustrated an optical lens system of a first embodiment. In the first embodiment, the optical lens system satisfies the parameter of tables 1-5. The symbols listed below are used in tables 1-5.

R: a radius of curvature.
L: a distance between surfaces on the axis 110.
Nd: a refractive index of lens element.
Vd: an Abbe number.
k: a conic constant.

TABLE 1

| surfaces | type | R (mm) | L (mm) | Nd | Vd |
|---|---|---|---|---|---|
| First surface | Aspher | 1.21 | 0.40 | 1.54 | 56.0 |
| Second surface | Asphere | 0.44 | 1.18 | | |
| Third surface | Asphere | −1.02 | 0.44 | 1.54 | 56.0 |
| Fourth surface | Asphere | −1.16 | 0.04 | | |
| aperture | Standard | Infinity | 0.01 | | |
| Fifth surface | Asphere | 1.78 | 0.46 | 1.54 | 56.0 |
| Sixth surface | Asphere | −1.75 | 0.05 | | |
| Seventh surface | Asphere | 4.00 | 0.49 | 1.54 | 56.0 |
| Eighth surface | Asphere | −1.69 | 0.05 | | |
| Ninth surface | Asphere | −1.94 | 0.26 | 1.64 | 56.0 |
| Tenth surface | Asphere | 1.47 | 0.05 | | |
| Eleventh surface | Asphere | 1.80 | 0.50 | 1.54 | 22.5 |
| Twelfth surface | Asphere | −1.86 | 0.34 | | |
| Front surface | Standard | Infinity | 0.21 | 1.52 | 58.6 |
| Rear surface | Standard | Infinity | 0.50 | | |
| sensor | Standard | Infinity | — | | |

TABLE 2

| Aspheric coefficient | First surface | Second surface | Third surface | Fourth surface | Fifth surface | Sixth surface |
|---|---|---|---|---|---|---|
| K | −1.2762 | −8.1322E−01 | 9.8180E−01 | 5.2332E−01 | −3.3236 | 2.9985 |
| $A_4$ | −1.0523E−01 | −5.4537E 02 | −4.5730E−2 | −5.0109E−02 | −3.2905E−02 | −2.1038E−01 |
| $A_6$ | 1.3221E−02 | 2.3328E−01 | −4.8997E−02 | 8.5827E−01 | −1.7249E−01 | 6.8929E−02 |
| $A_8$ | 0 | −2.1509E−01 | 2.013 | −2.4973 | 9.1481E−02 | −8.9535E−01 |
| $A_{10}$ | 0 | −2.1337 | −1.0014 | 1.2725E+01 | −4.4339 | 0 |
| $A_{12}$ | 0 | 6.8397 | −2.9125 | −3.6385E+01 | 7.0095 | 3.6089 |
| $A_{14}$ | 0 | −7.6493 | 1.1178E+01 | 4.7101E+01 | −1.0181E+01 | −1.0084E+01 |

| Aspheric coefficient | Seventh surface | Eighth surface | Ninth surface | Tenth surface | Eleventh surface | Twelfth surface |
|---|---|---|---|---|---|---|
| K | −4.1130E+01 | 4.0333 | 6.0670 | −5.6904 | −2.007 | −3.5605 |
| A4 | −8.9781E−02 | −1.0905E−01 | −3.7944E−01 | −5.0290E−02 | 7.3306E−02 | 2.1277E−01 |
| A6 | −1.2504E−01 | −1.9624E−01 | −4.9591E−02 | 1.3797E−02 | −2.3703E−02 | 1.6025E−01 |
| A8 | −1.0851E−01 | −5.6733E−02 | 1.7712E−01 | 2.7151E−02 | −2.0246E−02 | −5.4324E−02 |
| A10 | 6.0729E−02 | 4.6923E−01 | 3.3770E−01 | 1.4230E−02 | 1.3002E−02 | −9.3092E−02 |
| A12 | −1.1076 | 1.0152 | 1.0164 | −1.8262E−02 | 4.5768E−02 | −6.2929E−02 |
| A14 | 2.2135 | 1.0489 | 2.6229 | 6.5827E−02 | −1.1339E−01 | 3.8241E−02 |

TABLE 3

| F (mm) | F/# | FOV (2ω) | TTL (mm) |
|---|---|---|---|
| 0.85 | 2.03 | 153° | 4.96 |

TABLE 4

| D (mm) | f3 (mm) | f4 (mm) | f5 (mm) | f6 (mm) | SF1 | SF2 |
|---|---|---|---|---|---|---|
| 0.45 | 1.69 | 2.24 | −1.26 | 1.76 | −2.15 | 15.63 |

TABLE 5

| Y1 (mm) | T1 (mm) | Y2 (mm) | Z1 (mm) | T2 (mm) | MIC (mm) |
|---|---|---|---|---|---|
| 1.54 | 0.40 | 0.77 | 0.76 | 2.91 | 2.52 |

Figure 2:
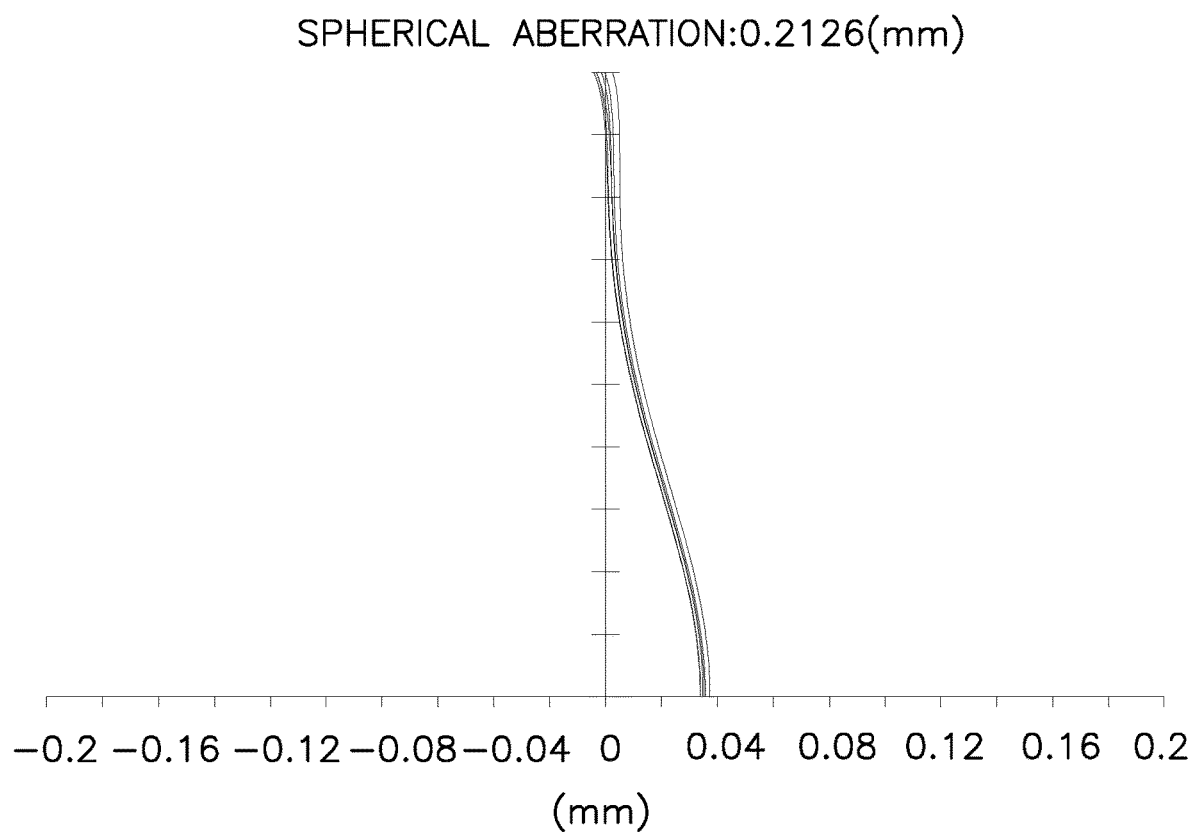
FIG. 2 is a graph showing longitudinal spherical aberration of the optical lens system of a first embodiment.
Figure 3:
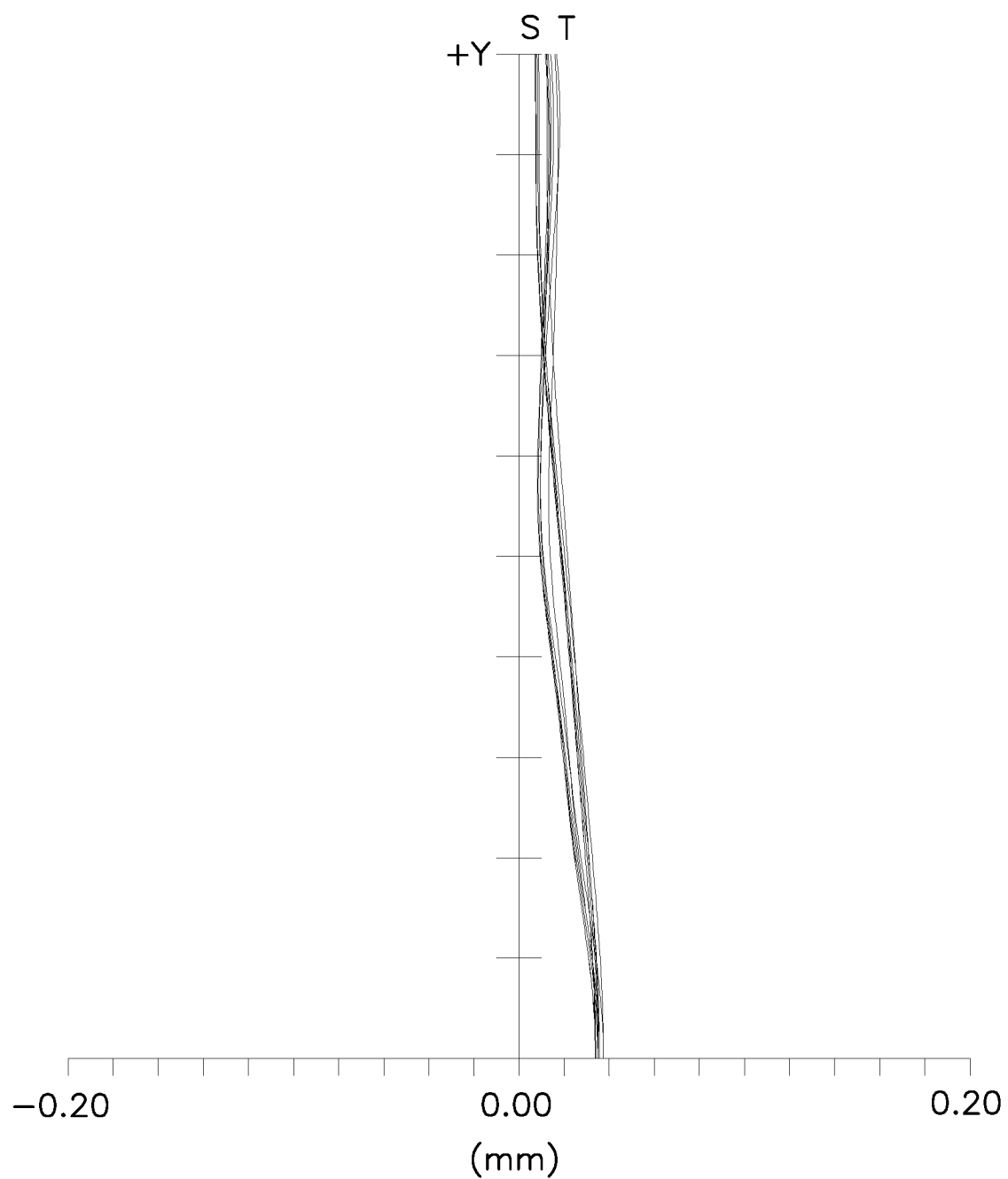
FIG. 3 is a graph showing field curvature of the optical lens system of the first embodiment.
Figure 4:
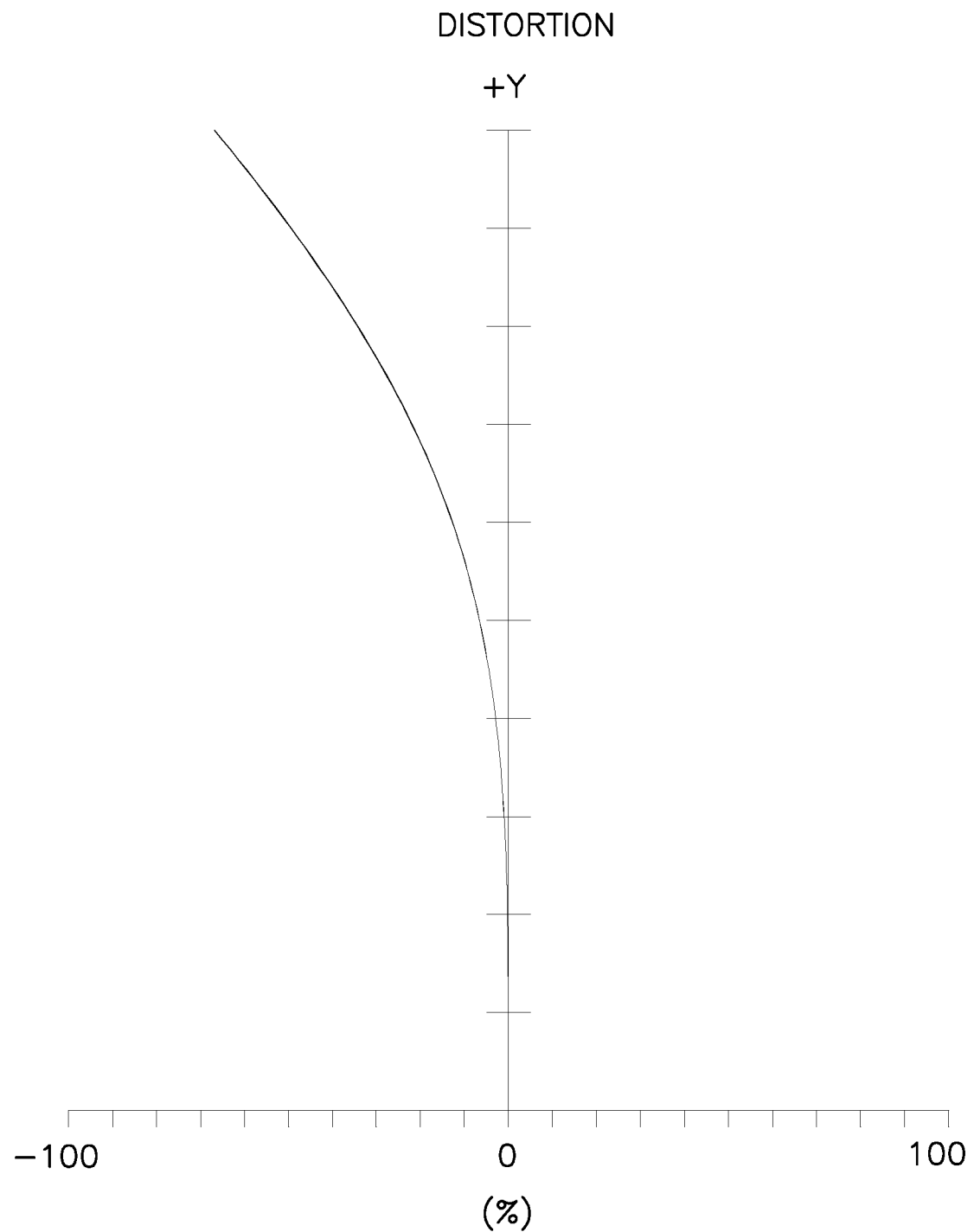
FIG. 4 is a graph showing distortion of the optical lens system of the first embodiment.

In the first embodiment, the longitudinal spherical aberration graph, the field curvature graph, the distortion graph of the optical lens system are respectively shown in FIGS. 2-4. The longitudinal spherical aberration of visible light (with a wavelength between 400-700 nm) shown in FIG. 2 is within a range of 0~0.04 mm. The sagittal field curvature and the tangential field curvature of visible light shown in FIG. 4 are kept in 0~0.04 mm. The distortion of visible light in FIG. 4 falls with a range of −80%~0. In the first embodiment, the longitudinal spherical aberration, field curvature, and distortion are well controlled in the optical lens.

Referring to tables 6-10 illustrates an optical lens system of a second embodiment. In the second embodiment, the optical lens system satisfies the parameters of Tables 6-10. The symbols listed below are used in Tables 6-10.

R: a radius of curvature.
L: a distance between surfaces on the axis 110.
Nd: a refractive index of lens element.
Vd: an Abbe number.
k: a conic constant.

TABLE 6

| surfaces | type | R (mm) | L (mm) | Nd | Vd |
|---|---|---|---|---|---|
| First surface | Aspher | 1.03 | 0.50 | 1.54 | 56.0 |
| Second surface | Asphere | 0.42 | 1.18 | | |
| Third surface | Asphere | −0.98 | 0.44 | 1.54 | 56.0 |
| Fourth surface | Asphere | −1.11 | 0.04 | | |
| aperture | Standard | Infinity | −0.01 | | |
| Fifth surface | Asphere | 1.87 | 0.55 | 1.54 | 56.0 |
| Sixth surface | Asphere | −1.75 | 0.05 | | |
| Seventh surface | Asphere | 3.90 | 0.48 | 1.54 | 56.0 |
| Eighth surface | Asphere | −1.69 | 0.05 | | |
| Ninth surface | Asphere | −1.95 | 0.25 | 1.64 | 56.0 |
| Tenth surface | Asphere | 1.49 | 0.04 | | |
| Eleventh surface | Asphere | 1.79 | 0.50 | 1.54 | 22.5 |
| Twelfth surface | Asphere | −1.82 | 0.34 | | |
| Front surface | Standard | Infinity | 0.21 | 1.52 | 58.6 |
| Rear surface | Standard | Infinity | 0.50 | | |
| sensor | Standard | Infinity | — | | |

TABLE 7

| Aspheric coefficient | First surface | Second surface | Third surface | Fourth surface | Fifth surface | Sixth surface |
|---|---|---|---|---|---|---|
| K | −1.2924 | −8.2050E−01 | 9.6264E−01 | 5.4851E−01 | −4.2391 | 2.9023 |
| $A_4$ | −1.0588E−01 | −1.8072E−01 | −3.9254E−02 | −4.6039E−02 | −4.3153E−02 | −2.0555E−01 |
| $A_6$ | 1.3213E−02 | 1.3661E−01 | −8.9604E−03 | 8.0678E−01 | −1.2987E−01 | 7.2210E−02 |
| $A_8$ | 0 | −2.4190E−01 | 2.0670 | −2.4827 | 2.7791E−01 | −8.4895E−01 |
| $A_{10}$ | 0 | −2.0889 | −9.2602E−01 | 1.2362E+01 | −4.2957 | 0 |
| $A_{12}$ | 0 | 6.9345 | −2.5153 | −3.8261E+01 | 7.1804 | 4.2377 |
| $A_{14}$ | 0 | −7.6002 | 1.3817E+01 | 5.5896E+01 | −2.1815E+01 | −9.0867 |

| Aspheric coefficient | Seventh surface | Eighth surface | Ninth surface | Tenth surface | Eleventh surface | Twelfth surface |
|---|---|---|---|---|---|---|
| K | −5.3194E+01 | 4.0533 | 6.0241 | −5.8520 | −1.8590 | −3.4433 |
| A4 | −9.2213E−02 | −1.1333E−01 | −3.7565E−01 | −5.3237E−02 | 7.6381E−02 | 2.1084E−01 |
| A6 | −1.2122E−01 | −2.1083E−01 | −3.4063E−02 | 9.9080E−03 | −2.1209E−02 | 1.5679E−01 |
| A8 | −1.1870E−01 | −6.0730E−02 | 1.8490E−01 | 2.6086E−02 | −1.8094E−02 | −5.7643E−02 |
| A10 | 1.7915E−02 | 4.9929E−01 | 3.0731E−01 | 2.0985E−02 | 6.0584E−03 | −9.6554E−02 |
| A12 | −1.2214 | 1.0822 | 9.5193E−01 | −1.5269E−02 | 3.8105E−02 | −6.6980E−02 |
| A14 | 1.7620 | 1.1529 | 2.5759 | 3.5346E−02 | −1.0882E−01 | 3.2630E−02 |

TABLE 5-continued

| Y1 (mm) | T1 (mm) | Y2 (mm) | Z1 (mm) | T2 (mm) | MIC (mm) |
|---|---|---|---|---|---|

TABLE 8

| F (mm) | F/# | FOV (2ω) | TTL (mm) |
|---|---|---|---|
| 0.92 | 2.04 | 150° | 5.11 |

TABLE 9

| D (mm) | f3 (mm) | f4 (mm) | f5 (mm) | f6 (mm) | SF1 | SF2 |
|---|---|---|---|---|---|---|
| 0.44 | 1.75 | 2.22 | −1.27 | 1.74 | −2.35 | 16.62 |

TABLE 10

| Y1 (mm) | T1 (mm) | Y2 (mm) | Z1 (mm) | T2 (mm) | MIC (mm) |
|---|---|---|---|---|---|
| 1.58 | 0.50 | 0.77 | 0.77 | 2.95 | 2.49 |

In the second embodiment, the longitudinal spherical aberration graph, the field curvature graph, and the distortion graph of the optical lens system are respectively shown in FIGS. 6-9.

Figure 5:
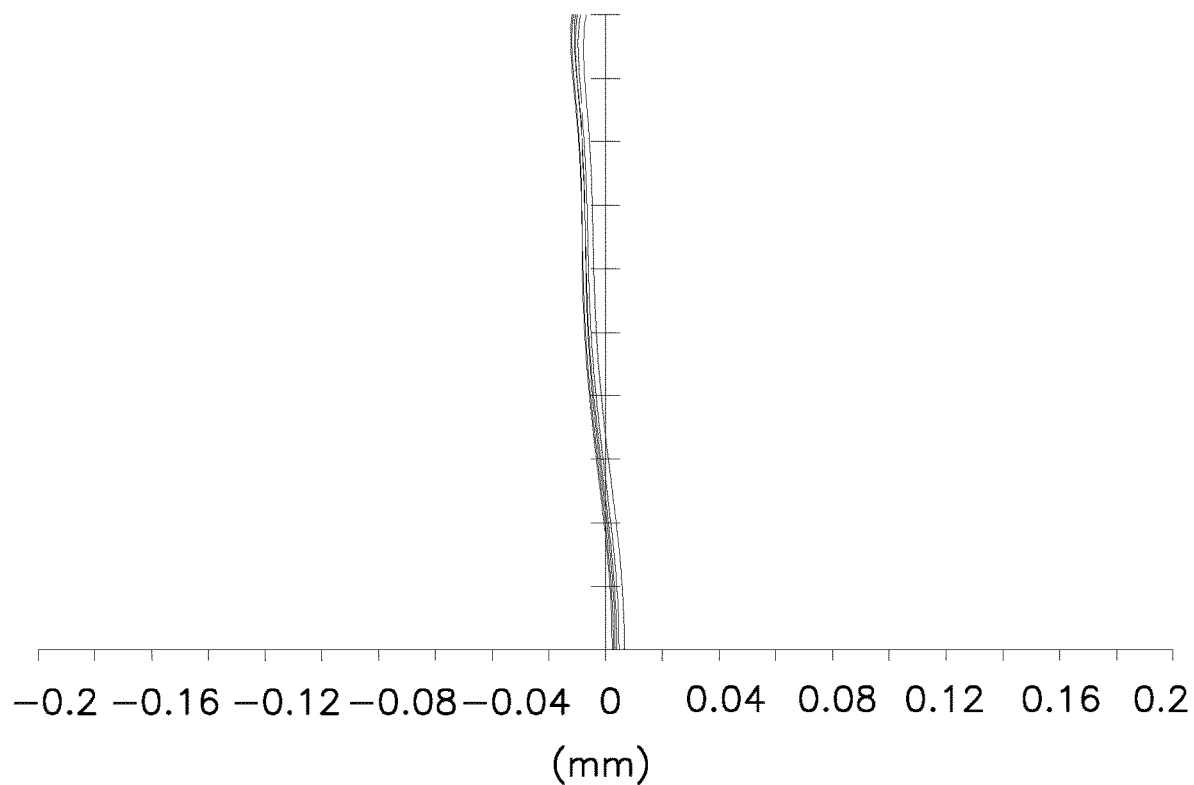
FIG. 5 is a graph showing longitudinal spherical aberration of the optical lens system of a second embodiment.
Figure 6:
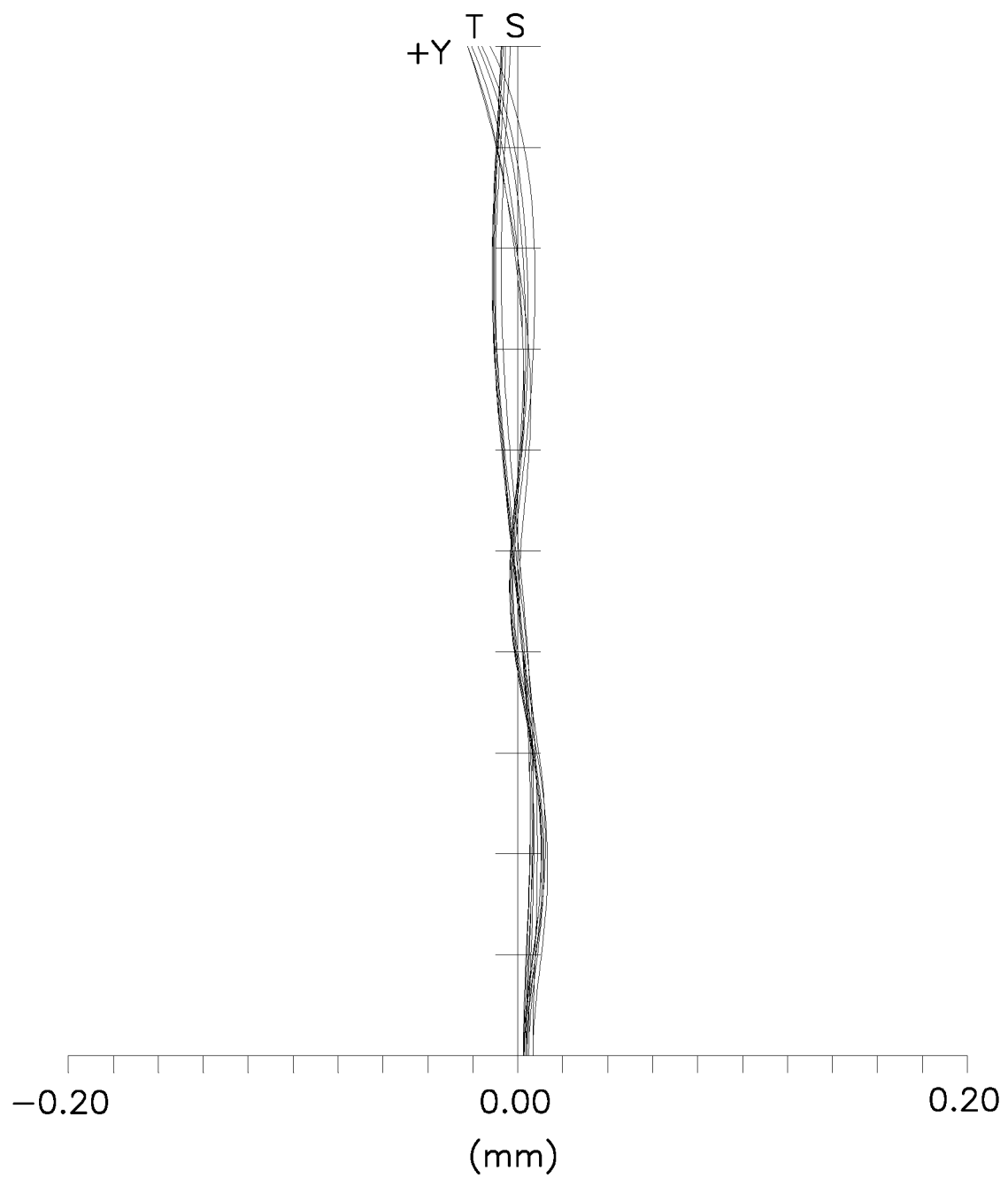
FIG. 6 is a graph showing field curvature of the optical lens system of the second embodiment.
Figure 7:
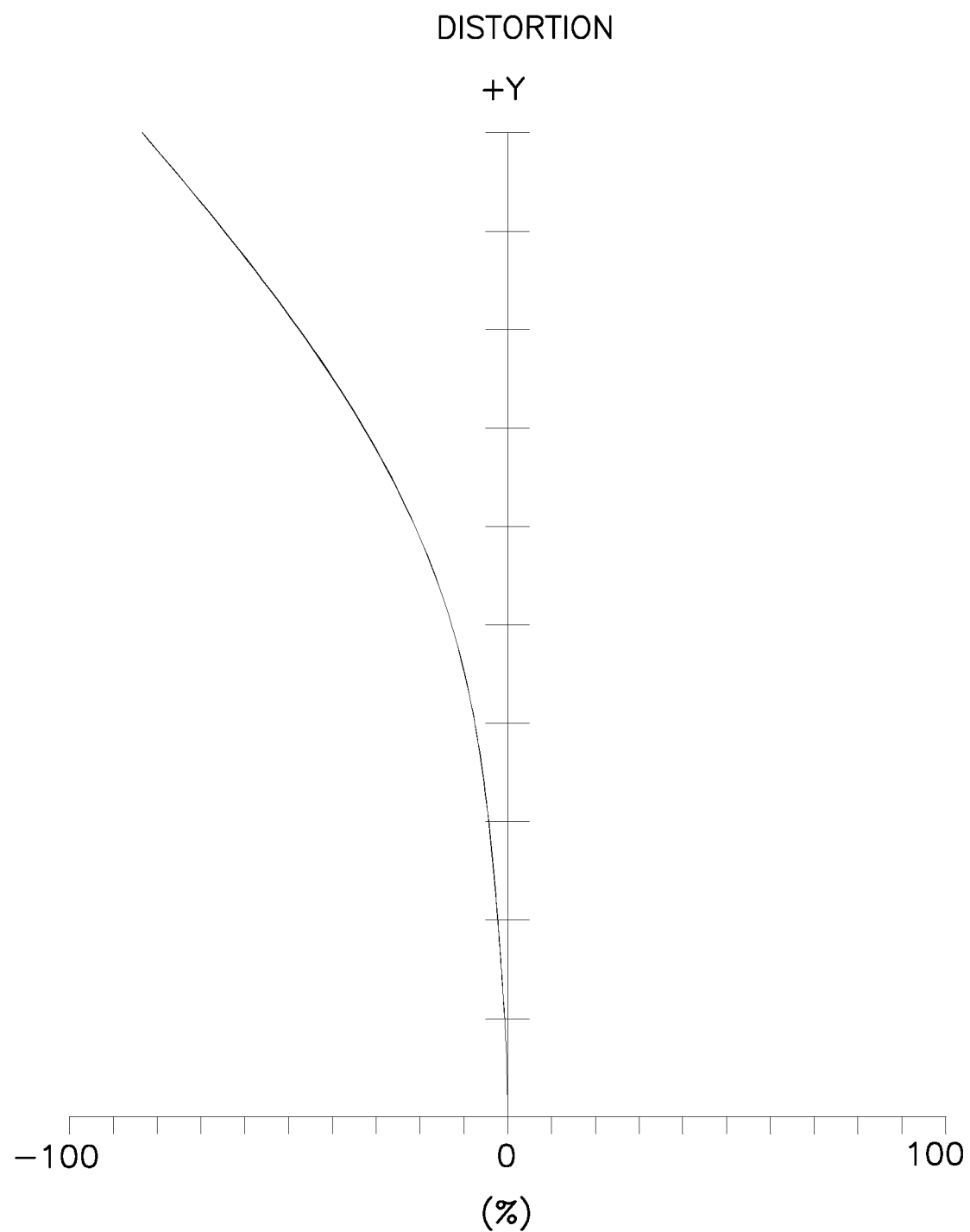
FIG. 7 is a graph showing distortion of the optical lens system of the second embodiment.

The longitudinal spherical aberration of visible light (with a wavelength between 400-700 nm) shown in FIG. 5 is within a range of 0.02 mm~-0.02 mm. The sagittal field curvature and the tangential field curvature of visible light shown in FIG. 6 are kept in -0.04 mm~0.02 mm. The distortion of visible light in FIG. 7 falls within a range of -100%~0. Obviously in the second embodiment, the longitudinal spherical aberration, field curvature, and distortion are well controlled in the optical lens.

The embodiments shown and described above are only examples. Many details are often found in the art such as the other features of an optical lens. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens system having an optical axis, the optical lens system comprising in order from an object side to an image side:
    a first lens element having a first surface and a second surface opposite to the first surface;
    a second lens element having a third surface and a fourth surface;
    a third lens element having a fifth surface and a sixth surface;
    a fourth lens element having a seventh surface and an eighth surface;
    a fifth lens element having a ninth surface and a tenth surface;
    a sixth lens element having an eleventh surface and a twelfth surface; and
    a sensor;
    wherein the optical lens system further comprises an aperture mounted between the second lens element and the third lens element, the optical lens system satisfies the following formulas:

$0.05<(D/TTL)<0.15; 2\omega>150;$ $1.8<|f3/F|<2.1; 2.3<|f4/F|<2.7;$ $1.3<|f5/F|<1.5; 1.8<|f6/F|<2.1;$ Wherein D is a diameter of the aperture, TTL is a length along the optical axis defined between the first surface of the first lens element and the sensor, $\omega$ is a half field view angle of the optical lens; F is the focal length of the optical lens, f3 is the focal length of the third lens element, f4 is the focal length of the fourth lens element, f5 is the focal length of the fifth lens element, f6 is the focal length of the sixth lens element.

2. The optical lens system of claim 1, wherein the aperture is located on the optical axis, a distance between the aperture and the fifth surface is smaller than a distance between the fourth surface and the aperture.

3. The optical lens system of claim 1, wherein the optical lens system further comprises an optical filter, the optical filter mounts between the sixth lens element and the sensor, the optical filter is spaced from the sixth element and the sensor.

4. The optical lens system of claim 3, wherein the optical filter has a front surface and a rear surface, the front surface and the rear surface are flat plane.

5. The optical lens system of claim 3, wherein the first lens element and the fifth lens element have negative power, the second lens element, the third lens element, the fourth lens element and the sixth lens element have positive power.

6. The optical lens system of claim 3, wherein the first surface is convex toward the object side, a center of the second surface is concave toward the image side, a periphery of the second surface is a flat surface, the third surface is concave toward the object side, the fourth surface is convex toward the image side, the fifth surface is convex toward the object side, the sixth surface is convex toward the image side, the seventh surface is convex toward the object the object side, the eighth surface is convex toward the image side, a center of the ninth surface is concave toward the object side, the tenth surface is concave toward the image side, the eleventh surface is convex toward the object side, the twelfth surface is convex toward the image side.

7. The optical lens system of claim 3, wherein the optical lens system satisfies the formulas: Y1/T1<4, Y1 is effective semi-diameter of the first surface of the first lens element to the optical axis, T1 is a length along the optical axis defined between the first surface and the second surface of the first lens element.

8. The optical lens system of claim 3, wherein the optical lens system satisfies the formulas: Y2/Z1>1, Y2 is maximum effective semi-diameter of the second surface of the first lens element to the optical axis, Z1 is a sag value of maximum effective aperture of second surface of the first lens element.

9. The optical lens system of claim 3, wherein the optical lens system satisfies the formulas: T2/MIC>1, T2 is a length along the optical axis defined between the aperture and the sensor, MIC is the maximum imaging circle.

10. The optical lens system of claim 3, wherein the first lens element, a second lens element, a third lens element, a fourth lens element, a fifth lens element and a sixth lens element are symmetrical about the axis.

* * * * *